United States Patent
Sasaki

(10) Patent No.: US 8,035,652 B2
(45) Date of Patent: Oct. 11, 2011

(54) COLOR SIGNAL GENERATING CIRCUIT, METHOD AND COLOR SIGNAL SYNTHESIZING CIRCUIT

(75) Inventor: Gen Sasaki, Osaka (JP)

(73) Assignee: Mega Chips Corporation, Osaka-shi (JP)

( * ) Notice: Subject to any disclaimer, the term of this patent is extended or adjusted under 35 U.S.C. 154(b) by 891 days.

(21) Appl. No.: 11/868,105

(22) Filed: Oct. 5, 2007

(65) Prior Publication Data

US 2008/0030602 A1    Feb. 7, 2008

Related U.S. Application Data

(62) Division of application No. 10/403,084, filed on Apr. 1, 2003, now abandoned.

(30) Foreign Application Priority Data

May 29, 2002  (JP) .................. 2002-155622

(51) Int. Cl.
G09G 5/00 (2006.01)
(52) U.S. Cl. ........ 345/589; 345/590; 345/591; 345/592; 345/619
(58) Field of Classification Search .......... None
See application file for complete search history.

(56) References Cited

U.S. PATENT DOCUMENTS

| | | | |
|---|---|---|---|
| 5,388,168 A * | 2/1995 | Sakashita et al. | 382/169 |
| 5,579,057 A * | 11/1996 | Banker et al. | 348/589 |
| 6,122,012 A | 9/2000 | Segman | |
| 6,275,267 B1 | 8/2001 | Kobayashi | |
| 6,529,244 B1 | 3/2003 | Hrusecky | |
| 6,744,917 B1 * | 6/2004 | Sadowski et al. | 382/162 |
| 2004/0056864 A1 * | 3/2004 | Valmiki et al. | 345/531 |

FOREIGN PATENT DOCUMENTS

JP    06-292164    10/1994

* cited by examiner

*Primary Examiner* — Kee M Tung
*Assistant Examiner* — Jwalant Amin
(74) *Attorney, Agent, or Firm* — Oblon, Spivak, McClelland, Maier & Neustadt, L.L.P.

(57) ABSTRACT

OSD data YD includes a color designating signal As and a color changing signal Ex. When a color register number is designated by the color designating signal As, a color storage unit 41 outputs an appropriate color signal. A Y signal is branched from the outputted color signal and subjected to a modulating process by the color changing signal Ex. The Y changing signal obtained by the modulating process is merged with a Cb signal and a Cr signal so as to form new color signal. The OSD data YD with changed color is subjected to a synthesizing process with image data XD according to the predetermined mixture ratio.

8 Claims, 9 Drawing Sheets

F I G. 1
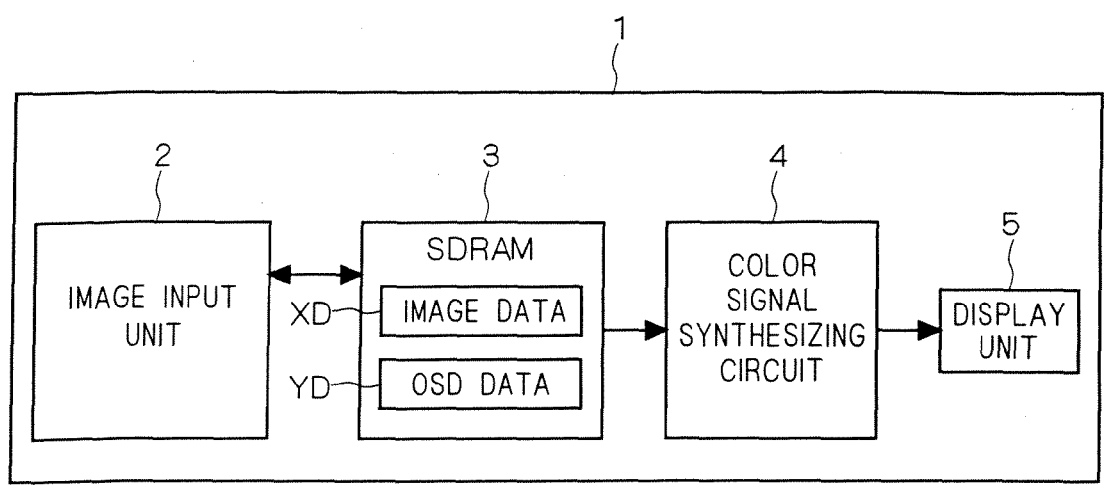

COLOR SIGNAL GENERATING CIRCUIT, METHOD AND COLOR SIGNAL SYNTHESIZING CIRCUIT

CROSS REFERENCE TO RELATED APPLICATIONS

This application is a divisional of and claims the benefit of priority under 35 U.S.C. §120 from U.S. Ser. No. 10/403,084, filed Apr. 1, 2003, and claims the benefit of priority under 35 U.S.C. §119 from Japanese Patent Application No. 2002-155622, filed on May 29, 2002, the entire contents of which are incorporated by reference herein.

BACKGROUND OF THE INVENTION

1. Field of the Invention

The present invention relates to a color signal generating circuit and a color signal synthesizing circuit.

2. Description of the Background Art

In a digital camera, a taken image is displayed on a monitor and textual information such as the date, time and counter of photo-taking is overlaid on the image. Predetermined buttons operation allows various menus to be shown on the camera image. The data thus displayed on camera image in an overlaid manner is referred to as OSD (On Screen Display) data.

An image such as textual information overlaid on the taken image is displayed in multi colors these days. This makes it possible to change colors depending on the contents of information to be displayed or to perform gradation display, thereby improving GUI (Graphic User Interface).

As for the pixels to be concerned, overlaid video images can be displayed with transparency by mixing colors for displaying textual information and colors for displaying the taken image at a predetermined mixture ratio. This achieves not only multi-color display but also various changes made in the display on the monitor.

However, there is a problem that using various colors for overlaid display requires a large storage capacity to store the color information. This problem is particularly serious in electronic appliances such as digital cameras and digital movies which have been increasingly reduced in size and cost.

FIGS. 7 to 9 are circuit diagrams of color signal synthesizing circuits which has been conventionally used. FIG. 7 shows a color signal synthesizing circuit capable of performing overlaid display with 16 colors, and FIGS. 8 and 9 show a color signal synthesizing circuit capable of performing overlaid display with 256 colors. The flows of the processes of these circuits and the details of the circuits will not be described here since they are equal to the description in embodiments of the present invention.

In the case of 16 colors-equipped circuit (FIG. 7) using 4-bits data per pixel in overlaid display, a color storage unit 141 holds 16 color registers (color registers 0 to 15). On the other hand, in the case of 256 colors-equipped circuit (FIG. 8) using 8-bits data per pixel in overlaid display, a color storage unit 151 holds 256 color registers (color registers 0 to 255). This brings about the problem that a growing number of colors expands the circuit scale, thereby increasing the cost and power consumption.

FIG. 9 shows a case adopting an SRAM as a color storage unit 161. This case can have a circuit scale smaller than the case with 256 color registers as shown in FIG. 8, but has the problem of cost increase.

SUMMARY OF THE INVENTION

The present invention is directed to a circuit for generating a color signal.

According to the present invention, a video digital signal inputted to the circuit includes a color designating signal for designating a basic color, and a color changing signal for making a change in the basic color. The circuit comprises a) means for storing color signals corresponding to types of colors which can be designated by the color designating signal in color signal storing means, and for outputting a color signal corresponding to the color designating signal upon input of the color designating signal included in the video digital signal, b) means for outputting a specific component changing signal by applying a predetermined calculating process for making the color changing signal operate to a signal of a specific color separation component (hereinafter, referred to as specific component signal) included in the color signal outputted by the means a), and c) means for forming a new color signal from the specific component changing signal and a signal of a color separation component other than the specific color separation component included in the color signal.

According to the present invention, it is possible to express the number of colors larger than that stored in the color signal storing means.

According to preferred embodiments of the present invention, the color signal storing means stores a Y signal, Cb signal and Cr signal as the color signals, and the specific component signal is the Y signal. It is therefore possible to provide a wide range of application of the circuit.

The present invention is also directed to a circuit for synthesizing a color signal.

According to the present invention, in a color signal synthesizing circuit for synthesizing a first video digital signal and second video digital signal, the second video digital signal inputted to the circuit includes a color designating signal for designating a basic color, and a color changing signal for making a change in the basic color. The circuit comprises a) means for storing color signals corresponding to types of colors which can be designated by the color designating signal in color signal storing means, and for outputting a corresponding color signal corresponding to the color designating signal upon input of the color designating signal included in the second video digital signal, b) means for outputting a specific component changing signal by applying a predetermined calculating process for making the color changing signal operate to a signal of a specific color separation component (hereinafter, referred to as specific component signal) included in the color signal outputted by the means a), c) means for outputting a new color signal from the specific component changing signal and a signal of a color separation component other than the specific color separation component included in the color signal, and d) means for outputting a synthesized color signal obtained by synthesizing the color expressed by the first video digital signal and the color expressed by the new color signal on the basis of a mixture ratio determining signal assigned to each color signal stored in the color signal storing means.

It is therefore an object of the present invention to provide a signal synthesizing technique capable of performing multi-color overlaid display on the monitor, without increasing the circuit scale.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an overall view of an image processing circuit utilizing a color signal synthesizing circuit according to the present invention;

DESCRIPTION OF THE PREFERRED EMBODIMENTS

Figure 2:
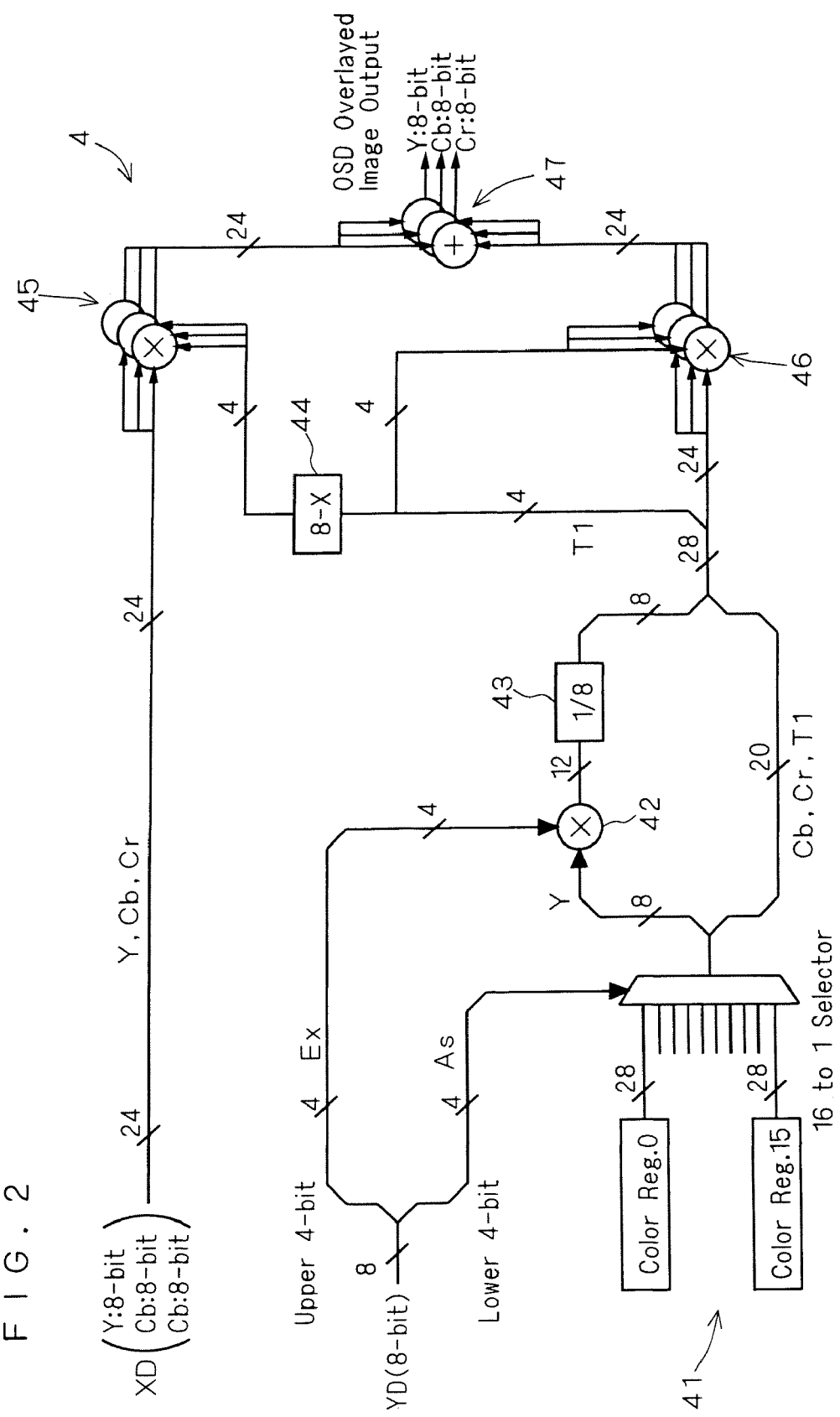
FIG. 2 shows a color signal synthesizing circuit according to a first embodiment.

Hereinafter, embodiments of the present invention will be described with reference to the drawings. FIG. 1 is a functional block diagram showing a color processing device 1 including a color signal synthesizing circuit 4 according to first to fifth embodiments of the present invention.

The color processing device 1 includes: an image input unit 2 for receiving and preprocessing a color signal; a storage unit 3 for storing the color signal processed in the image input unit 2; a color signal synthesizing circuit 4 for synthesizing and processing image data XD and OSD data YD stored in the storage unit 3; and a display unit 5 for displaying an output signal of the color signal synthesizing circuit 4.

The storage unit 3 may be a semiconductor memory such as an SDRAM, and the display unit 5 may be formed from a liquid crystal monitor.

The color processing device 1 is installed, for example, in a digital camera. In this case, the image data XD inputted into the image input unit 2 is photo-taking data taken by the digital camera, and the OSD data YD is video data overlaid on the image data XD to indicate textual information or the like.

First Embodiment

Next, a first embodiment of the present invention will be described below. FIG. 2 is a functional block diagram showing the color signal synthesizing circuit 4 according to the first embodiment.

This circuit inputs 24-bits image data XD and 8-bits OSD data YD. Each of the lower 4-bits of the OSD data YD is a color designating signal As for designating the basic colors used for overlaid display, and each of the upper 4-bit is a color changing signal Ex for making changes to the basic colors by acting on a luminance signal Y.

The color signal synthesizing circuit 4 includes a color storage unit 41 having 16 color registers 0 to 15. The color storage unit 41 has a function as a selector, and also has a function of outputting the signals corresponding to the color when any color register number is designated by the color designating signal As.

Each color register stores 28-bits data including 8-bits Y values, 8-bits Cb values and 8-bits Cr values as the color separation components, and a 4-bits mixture rate determining signal T1 which determines the ratio (can be regarded as transmittance) of mixing the image data XD and the OSD data YD.

The color registers in the present embodiment have the following format:
0 to 7 bits: Y value
8 to 15 bits: Cb value
16 to 23 bits: Cr value
24 to 27 bits: T1.
This indicates that the lower 24 bits form the color components.

In the present embodiment, a mixture ratio determining signal T1 is set at a value out of nine levels from 0 to 8. When the value is set at 0, the pixel shows 100% image data XD. When the value is set at 1, 2, . . . , 7, the OSD data YD is mixed at a ratio of ⅛, ⅖, . . . , ⅞, respectively. When the value is set at 8, 100% OSD data YD is displayed.

When a register number is designated by the color designating signal As and the color signal of the designated color register is outputted from the color storage unit 41, the signal is branched into the luminance signal Y and the other signals Cb, Cr and T1.

In a calculator 42, the luminance signal Y is multiplied by the color changing signal Ex which is the upper 4 bits of the OSD data YD. Thereby changes are made to the luminance components of a color outputted from the color storage unit 41. Since the luminance signal Y is multiplied by the upper 4 bits of the OSD data YD, the luminance components can be changed into 16 patterns at the maximum.

The bit number of the luminance components increases by 4 bits in the calculator 42; however, in a calculator 43, the bit number is adjusted to ⅛ times by shifting to the right by 3 bits so as to truncate the uppermost 1 bit while using a limiter, and to truncate the lower 3 bits. In this case, the color changing signal Ex can be so determined as to secure changes of 16 patterns in the luminance components by truncating a total of 4 bits.

A signal obtained by making changes to the luminance components to adjust the bit number (hereinafter, referred to as Y change signal) is again merged with other signals (the Cb signal, Cr signal and mixture ratio determining signal T1).

Next, the mixture ratio determining signal T1 is branched from the merged signals. The other signals, that is, the Y change signal, Cb signal and Cr signal are inputted to a calculator 46. On the other hand, the mixture ratio determining signal T1 is branched into two directions: one is inputted to the calculator 46, and the other to a calculator 44.

The calculator 44 is a signal for calculating the proportion of the image data XD content in the mixture. Since the mixture ratio determining signal T1 can be a value of from 0 to 8 as described above, the calculator 44 subtracts the value designated by the mixture ratio determining signal T1 from 8, thereby calculating the proportion of the image data XD content in the mixture.

In a calculator 45, each color component of the inputted image data XD is multiplied by the mixture ratio calculated by the calculator 44. On the other hand, in the calculator 46, the Y change signal, Cb signal and Cr signal outputted from the color storage unit 41 are respectively multiplied by the mixture ratio determining signal T1.

Although the description so far is simplified, in actual cases, when the mixture ratio determining signal T1 indicates the value of X, each signal value is multiplied by X/8 in the calculator 46, and each signal value is multiplied by (8−X)/8 in the calculator 45.

Finally, in an adder 47, the signal outputted from the calculator 45 is combined with signals having the common color separation components outputted from the calculator 46, and the synthesized color signal is outputted.

The synthesized color signals thus outputted are the 8-bits Y signal, 8-bits Cb signal and 8-bits Cr signal, and the synthesized video image is displayed in the display unit 5.

Although the color storage unit 41 is provided with 16 color registers in the present embodiment, utilizing the color change signal Ex composed of the upper 4 bits of the OSD data YD allows the luminance components to have modulations of 16 patterns, which corresponds to a 256-color pallet. In short, 256 color is achieved by the circuit structure that used to have only 16 colors in the conventional circuit. Therefore, it is possible to realize decreases in the circuit scale and the cost.

Second Embodiment

Figure 3:
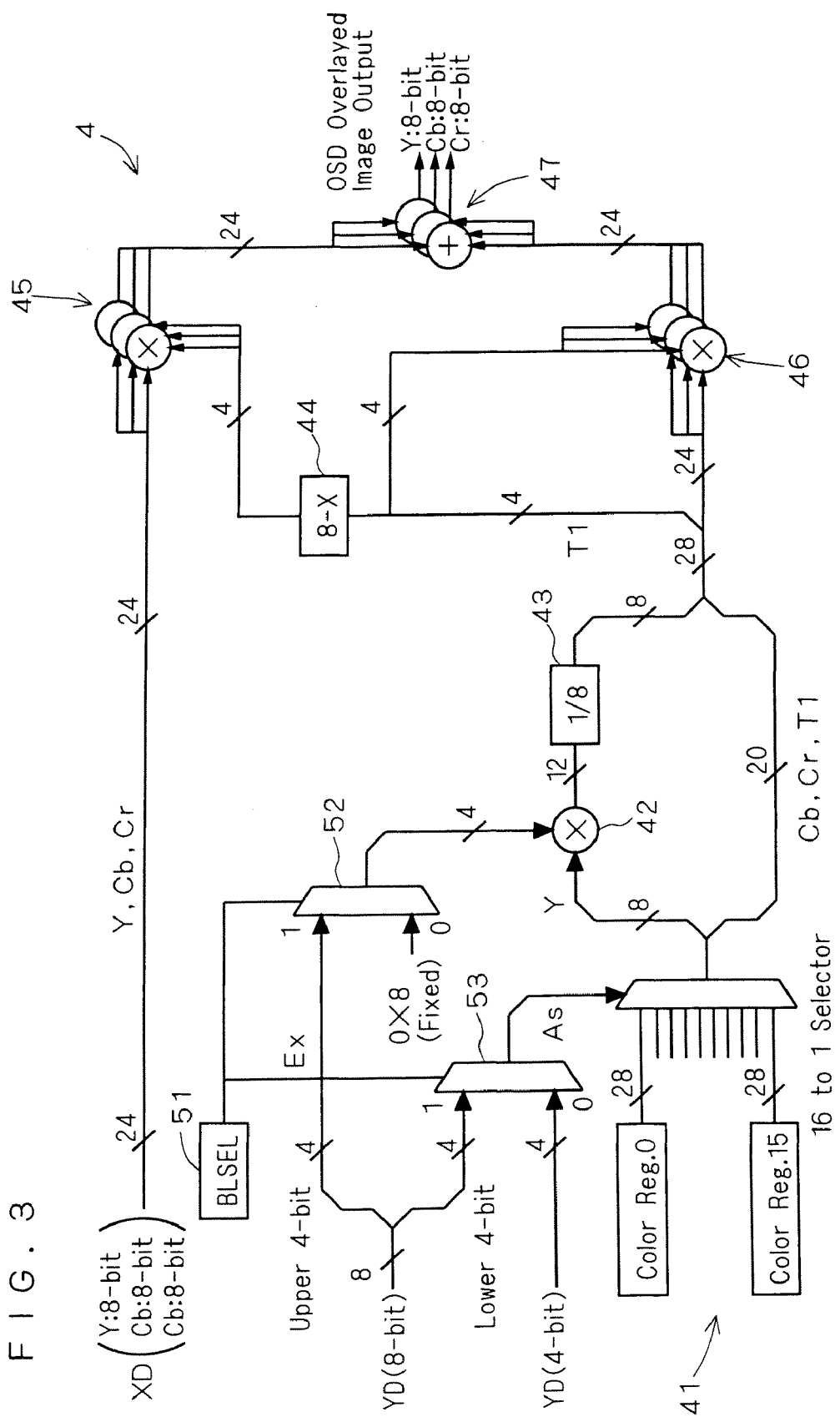
FIG. 3 shows a color signal synthesizing circuit according to a second embodiment.

Next, a second embodiment will be described below with reference to FIG. 3. The basic configuration of a circuit in the second embodiment is substantially similar to that in the first embodiment. Therefore, the common components will not be described herein.

In the second embodiment, the bit number of the OSD data YD to be inputted can be selected from two patterns of 8 bits and 4 bits. The 8-bits OSD data YD includes the color changing signal Ex in which the upper 4 bits give changes to the luminance signal and the color designating signal As in which the lower 4 bits designate colors. In contrast, the 4-bits OSD data YD includes only the color designating signals As for designating colors.

In the present embodiment, the circuit is provided with two selectors 52 and 53 for switching the OSD data YD to be inputted, and a selection instructing unit 51 for transmitting selection information to the selectors 52 and 53.

In the selection instructing unit 51, "1" is set in the case of selecting the 8-bits OSD data YD, and "0" is set in the case of selecting the 4-bits OSD data YD. The selection instructing unit 51 sets selection information according to the instruction from a control unit (a function unit for controlling the entire circuit such as a CPU) which is not shown in the figure, and outputs the selection information to each of the selectors 52 and 53.

The operations of the circuit in the case where "1" is set to each of the selectors 52 and 53 are similar to that in the first embodiment.

The operations of the circuit in the case where "0" is set to each of the selectors 52 and 53 will be described below.

Similar to the case in the first embodiment, a color register is designated by the color designating signal As formed from the entire OSD data YD, and the 28-bits color signal is outputted. In the same manner, the Y signal is separated from the color signal, inputted to the calculator 42, and multiplied by the output from the selector 52. Herein, in the case where the selection information is "0", the selector 52 outputs the value obtained by multiplying the Y signal by 8, that is, the value which shifts the Y signal to the left by 3 bits. Consequently, the Y signal is shifted to the left by 3 bits in the calculator 42. In the calculator 43 the Y signal is shifted to the right by 3 bits in a calculation, and hence the Y signal is outputted as it is without any change.

Again, the Cb signal, Cr signal and Y signal are merged with each other, and then a process similar to that in the first embodiment is performed. It must be noted that in this case (where the OSD data YD is 4 bits), the Y signal is not modulated, and hence it is possible to use the 16 colors stored in the color storage unit 41 as the colors for overlaid display.

In the second embodiment, the structure with a single color storage unit 41 having 16 color registers makes the OSD data YD to be inputted be shifted between 4 bits and 8 bits, making it possible that when 8-bits OSD data YD is inputted, overlaid display is shown with 256 colors, and when 4-bits OSD data YD is entered, overlaid display is shown with 16 colors.

Hence the electronic device provided with the color synthesizing circuit 4 can be designed depending on its use: for example, a lot of colors can be used by increasing the input data size or the input data size can be decreased by using a limited number of colors.

Third Embodiment

Figure 4:
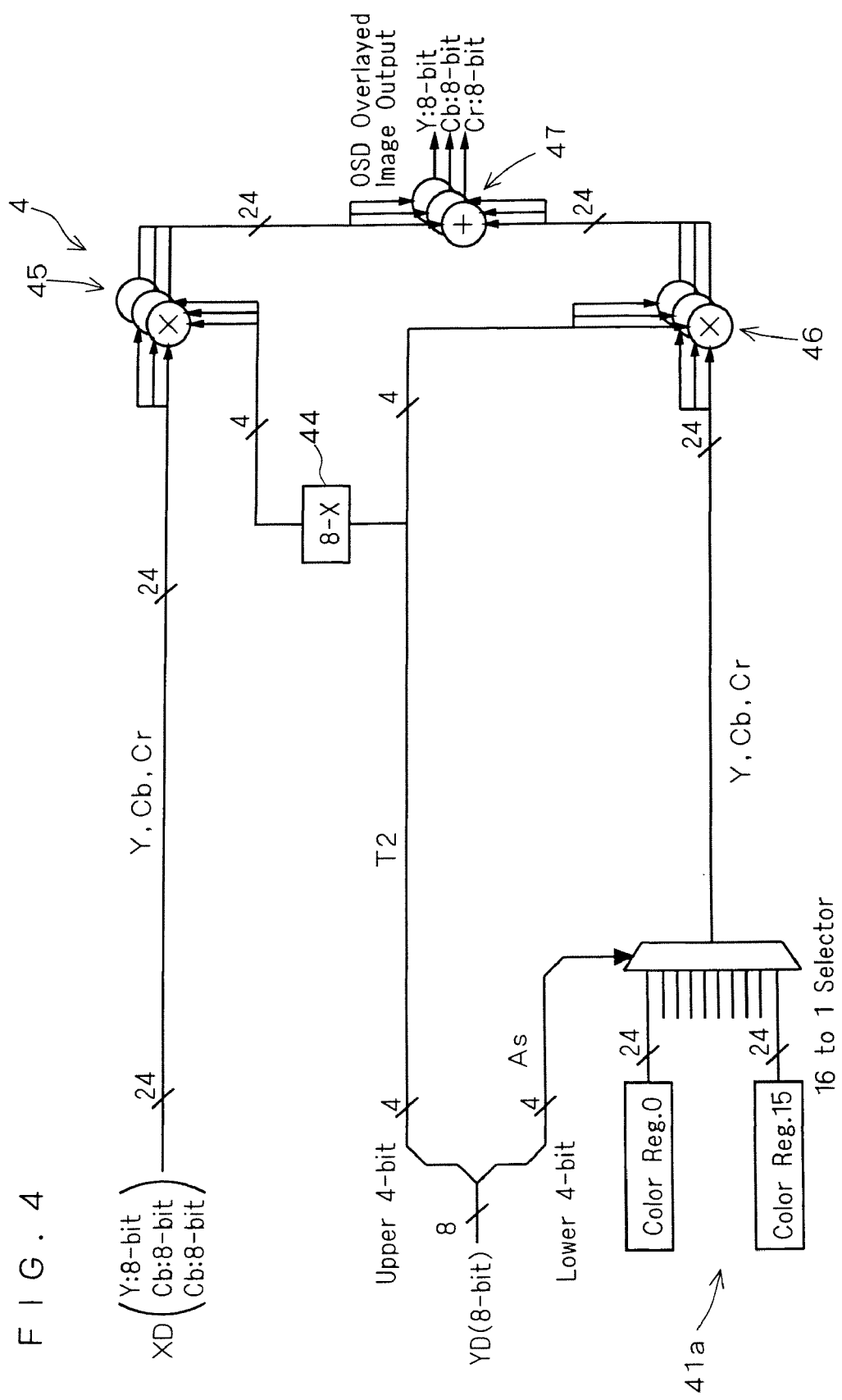
FIG. 4 shows a color signal synthesizing circuit according to a third embodiment.

A third embodiment will be described below with reference to FIG. 4. In the third embodiment, the OSD data YD to be inputted has 8 bits: each of the upper 4 bits is a mixture ratio designating signal T2 for designating the mixture ratio between the image data XD and the OSD data YD, and each of the lower 4 bits is the color designating signal As for designating the basic colors.

The color storage unit 41a includes 16 color registers. Each of the color registers 0 to 15 has 8-bits Y signals, 8-bits Cb signals, 8-bits Cr signals, that is, a total of 24-bits data.

The color registers in the present embodiment have the following format.
0 to 7 bits: Y values
8 to 15 bits: Cb values
16 to 23 bits: Cr values
This indicates that unlike in the first and second embodiments, no mixture ratio determining signal T1 is included and a signals for color components are exclusively included.

The color storage unit 41a has the function as a selector, and also has the function of outputting color signals based on the color register number designated by the color designating signal As. The color signals outputted from the color storage unit 41a are inputted to the calculator 46.

The mixture ratio determining signal T2 is branched into two directions: one is inputted to the calculator 46, and the other to the calculator 44 to calculate the proportion of the image data XD content in the mixture. The calculated mixture ratio is inputted to the calculator 45. After this, the image data XD and the OSD data YD are multiplied by the respective mixture ratio in the same manner as in the first embodiment, and combined with each other in the calculator 47 to be outputted therefrom.

As described above, in the third embodiment, the transmittance capable of being expressed pixel by pixel can be modulated by making the signals for designating the mixture ratio be included in the OSD data YD to be inputted without increasing the number of color registers. This can achieve more expressive information display with the same circuit scale as the conventional 16 colors-equipped circuit.

Fourth Embodiment

Figure 5:
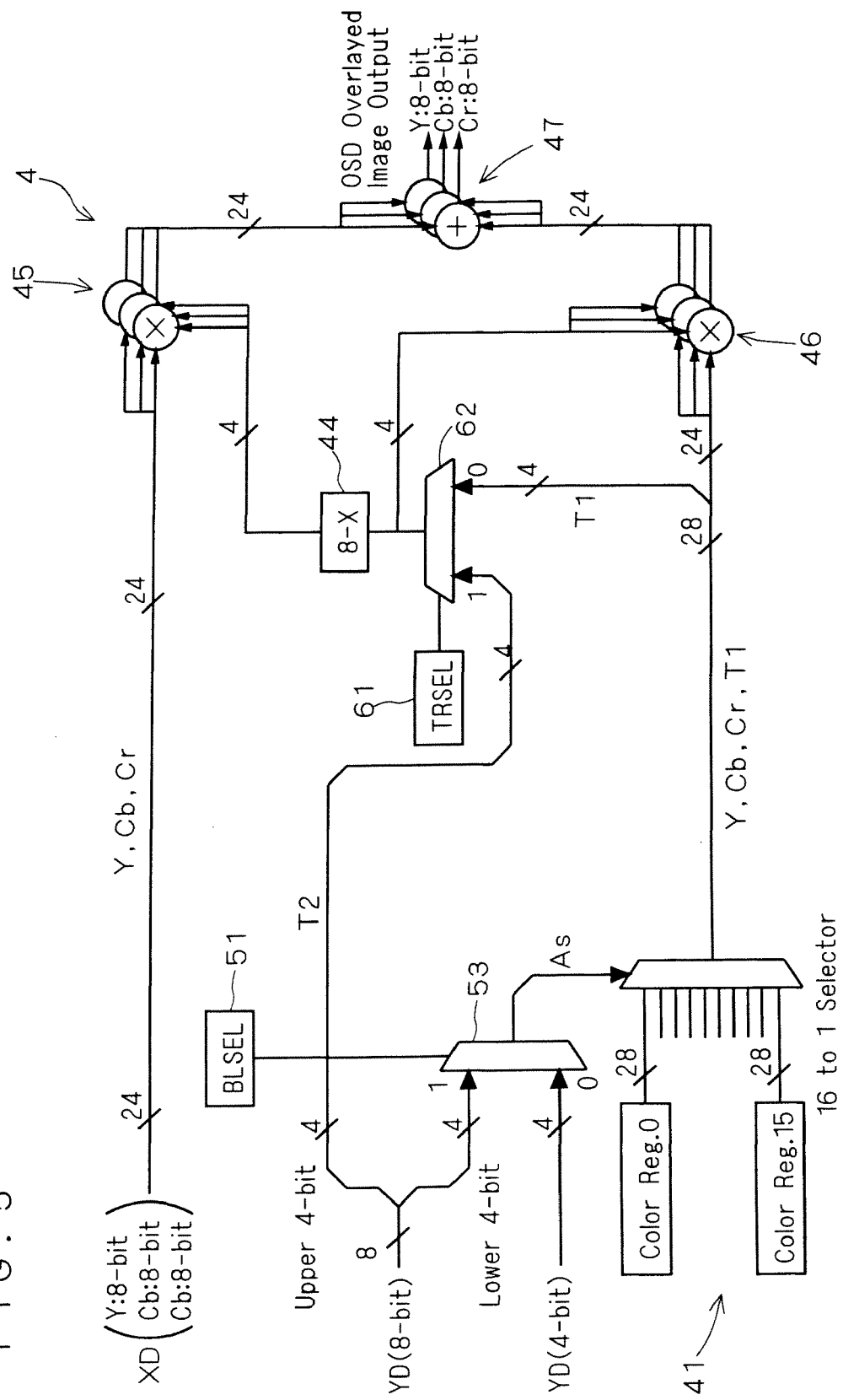
FIG. 5 shows a color signal synthesizing circuit according to a fourth embodiment.
Figure 6:
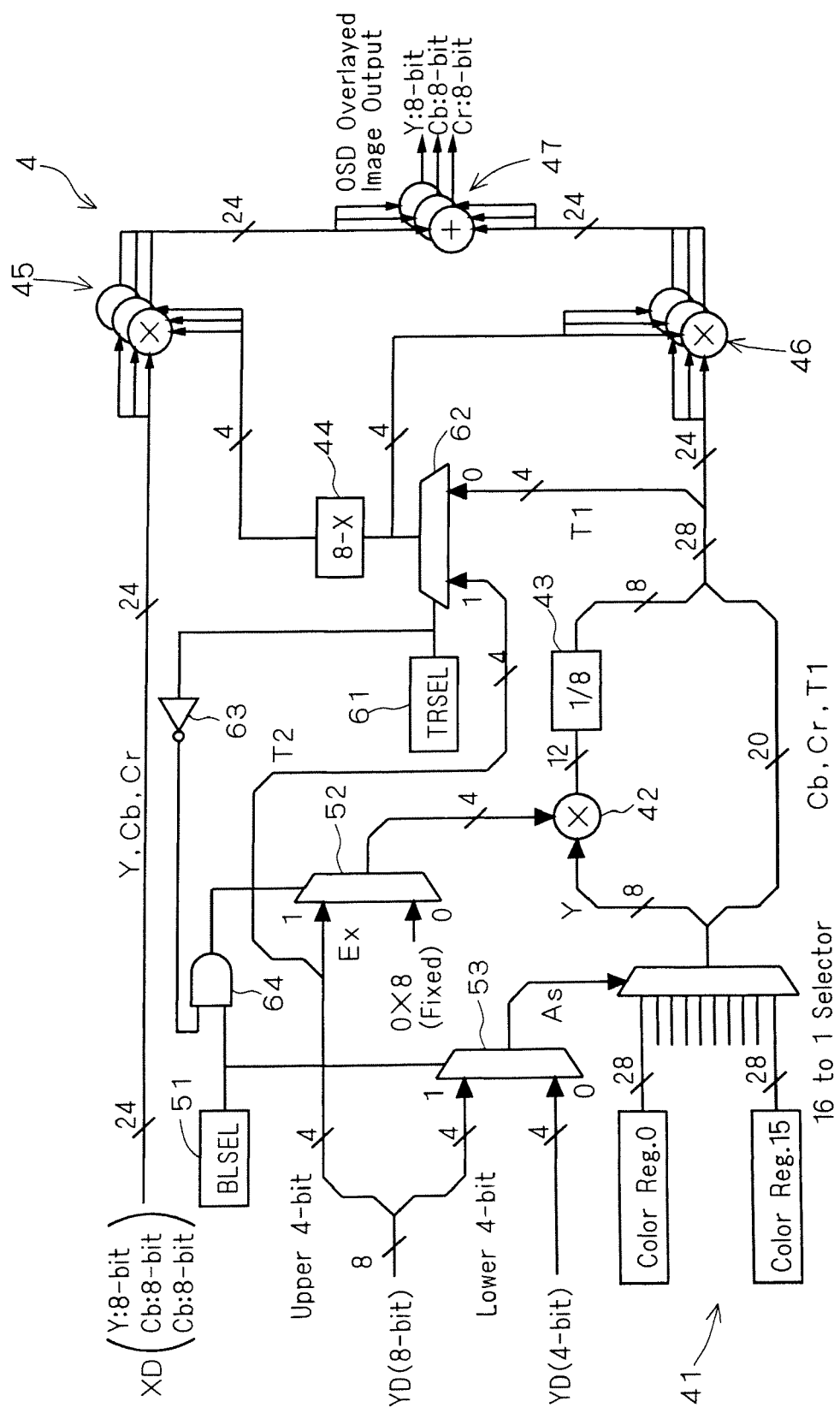
FIG. 6 shows a color signal synthesizing circuit according to a fifth embodiment.

A fourth embodiment will be described below with reference to FIG. 5. The fourth embodiment is an extension to the third embodiment, and the OSD data YD to be inputted can be switched between 8 bits and 4 bits.

The 8-bits OSD data YD has upper 4 bits each of which is the mixture ratio designating signal T2 for designating the mixture ratio between the image data XD and the OSD data YD, and lower 4 bits each of which is the color designating signal As for designating the basic colors. In contrast, the 4-bits OSD data YD is exclusively consisted of the color designating signal As for designating the basic colors.

In the present embodiment, the circuit is provided with a selector 53 for switching the OSD data YD to be inputted, a selection instructing unit 51 for transmitting selection information to the selector 53, a selector 62 for selecting the signal to be adopted for the mixture ratio, and the selection instructing unit 61 for transmitting selection information to the selector 62.

In the selection instructing unit 51, "1" is set to select the 8-bits OSD data YD, and "0" is set to select the 4-bits OSD data YD.

In the selection instructing unit 61, "1" is set to select the mixture ratio designating signal T2, and "0" is set to select the mixture ratio determining signal T1.

When "1" is set in each of the selectors 53 and 62, the circuit performs substantially the similar operations to the third embodiment. The only difference is that in the color storage unit 41, the 28-bits color signal including the mixture ratio determining signal T1 is outputted unlike in the third embodiment. However, the mixture ratio determining signal T1 is not used, and the mixture ratio designating signal T2 inside the OSD data YD is used for a synthesizing process.

Description will be given of operations of the circuit when "0" is set in each of the selectors 53 and 62.

In this case, a color register is designated by the color designating signal As formed from the entire 4-bits OSD data YD, and the 28-bits color signal is outputted. Then, the T1 signal is separated from the color signal and inputted to the selector 62. Since "0" is set in the selector 62, the T1 signal is outputted.

One of the outputted T1 signals is inputted to the calculator 46 and the other is inputted to the calculator 44 to calculate the mixture ratio on the image data XD side and the obtained value is inputted to the calculator 45. In the calculators 45, 46, the respective mixture ratios are multiplied and in the calculator 47, the signals of the common color synthesizing components are combined with each other so as to output synthesized signals.

In the fourth embodiment the structure with a single color storage unit 41 having 16 color registers makes the OSD data YD to be inputted be shifted between 4 bits and 8 bits, making it possible that when 8-bits OSD data YD is entered, the transmittance of overlaid display is modulated by using the mixture ratio designating signal T2 contained in the OSD data YD, and when 4-bits OSD data YD is inputted, a color synthesizing process is performed in accordance with the mixture ratio stored in the color storage unit 41. Hence the electronic device provided with the color synthesizing circuit 4 can be designed depending on its use: for example, the transmittance can be modulated freely by the input data by increasing the input data size or the input data size can be decreased to save memory by using fixed values inside the color registers as the transmittance.

Fifth Embodiment

A fifth embodiment encompasses the first to fourth embodiments described so far.

In the present embodiment, the OSD data YD to be inputted can be one of the following three kinds:
(1) upper 4-bits color changing signals "Ex"; lower 4-bits color designating signals As
(2) upper 4-bits mixture ratio designating signals T2; lower 4-bits color designating signals As
(3) 4-bits color designating signals As only
In short, (1) and (2) are 8-bits data as a whole and (3) is 4-bits data as a whole.

The color signal synthesizing circuit 4 of the present embodiment is provided with three selectors 52, 53 and 62, a selection instructing unit 51 for setting selection information to the selectors 52 and 53, and a selection instructing unit 61 for setting selection information to the selector 62.

The selection instructing unit 61 and the selector 52 are connected to each other via an inverter 63 and an AND circuit 64, whereas the selection instructing unit 51 and the selector 52 are connected with each other via an AND circuit 64. Therefore, when "1" is set in the selection instructing unit 51 and "0" is set in the selection instructing unit 61, the selection information "1" is transmitted to the selector 52, and in the other cases the selection information "0" is transmitted to the selector 52.

Hereinafter, description will be given of the operations of the color synthesizing circuit 4 by dividing the inputted OSD data YD into the cases (1), (2) and (3).

1. When OSD data is (1)

"1" is set in the selection instructing unit 51 and "0" is set in the selection instructing unit 61. As a result, selection information "1", "1" and "0" are transmitted to the selectors 52, 53 and 62, respectively.

In this case, the circuit operates in the similar manner to the first embodiment. More specifically, the basic colors are designated by the color designating signal As included in the OSD data YD, and the luminance components of the basic colors are modulated by the color changing signal Ex. Then, the image data XD and the OSD data YD are synthesized by using the mixture ratio determining signal T1 stored in the color register.

2. When OSD data is (2)

"1" is set in each of the selection instructing unit 51 and the selection instructing unit 61. As a result, selection information "0", "1" and "1" are transmitted to the selectors 52, 53 and 62, respectively.

In this case, the circuit operates in the similar manner to the third embodiment. More specifically, the colors for overlaid display are designated by the color designating signal As included in the OSD data YD, and the transmittance of the overlaid display is modulated by the mixture ratio designating signal T2. It must be noted that the color signal outputted from the color storage unit includes the T1 signal, but the T1 signal is not used unlike in the third embodiment.

3. When OSD data is (3)

"0" is set in each of the selection instructing unit 51 and the selection instructing unit 61. As a result, selection information "0" is transmitted to each of the selectors 52, 53 and 62.

Figure 7:
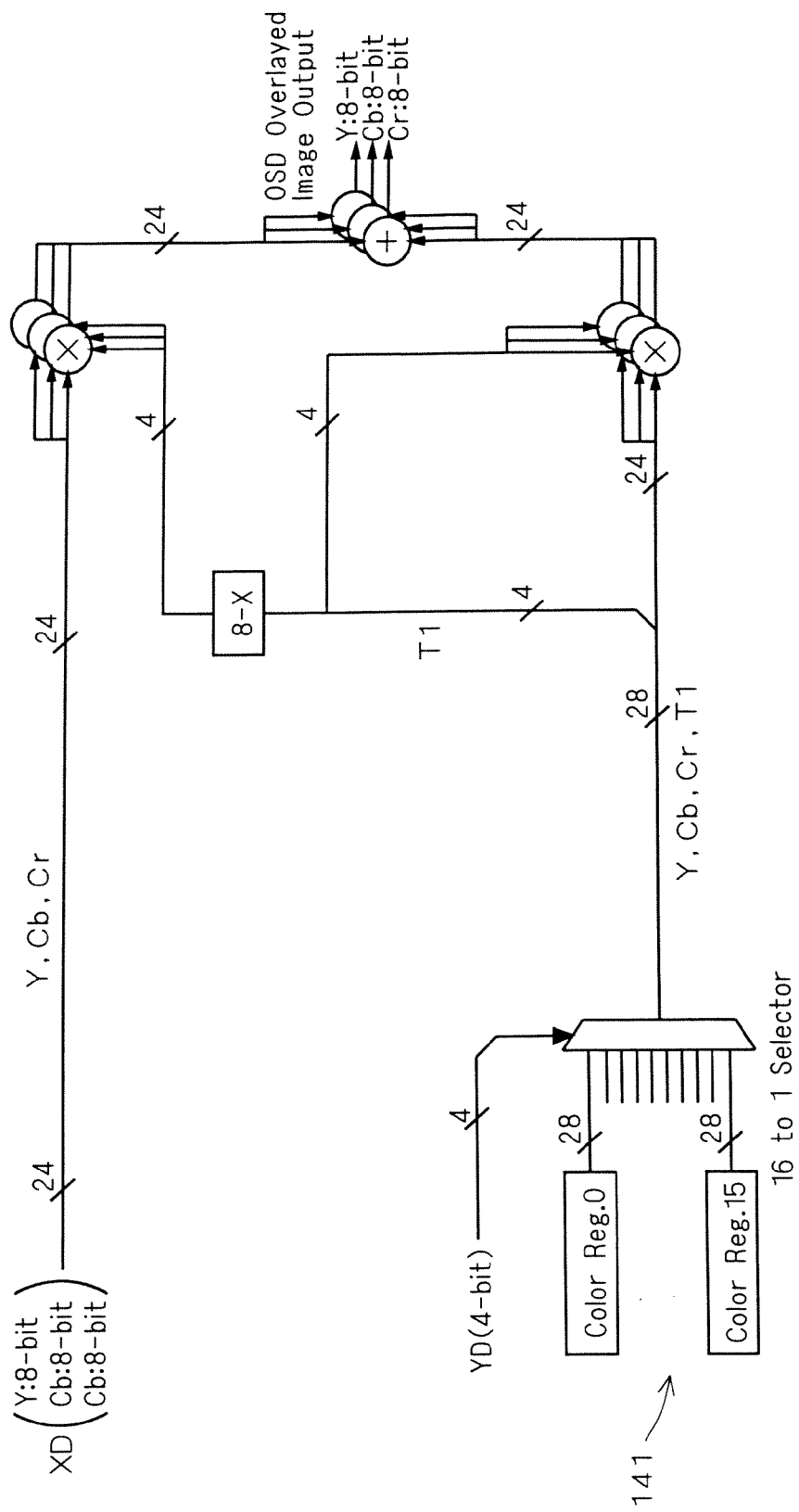
FIG. 7 shows a first conventional example of a color signal synthesizing circuit.
Figure 8:
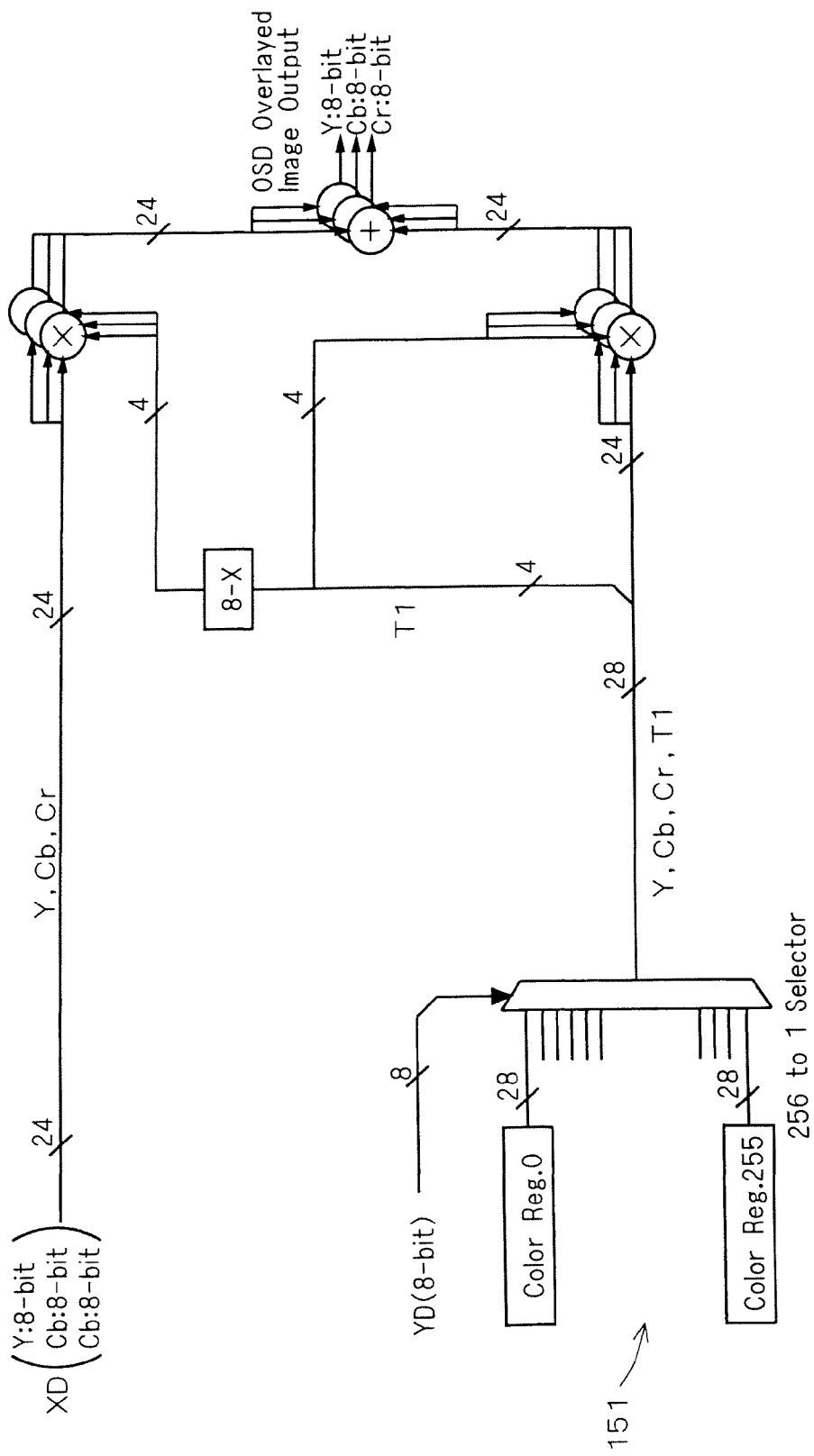
FIG. 8 shows a second conventional example of a color signal synthesizing circuit.
Figure 9:
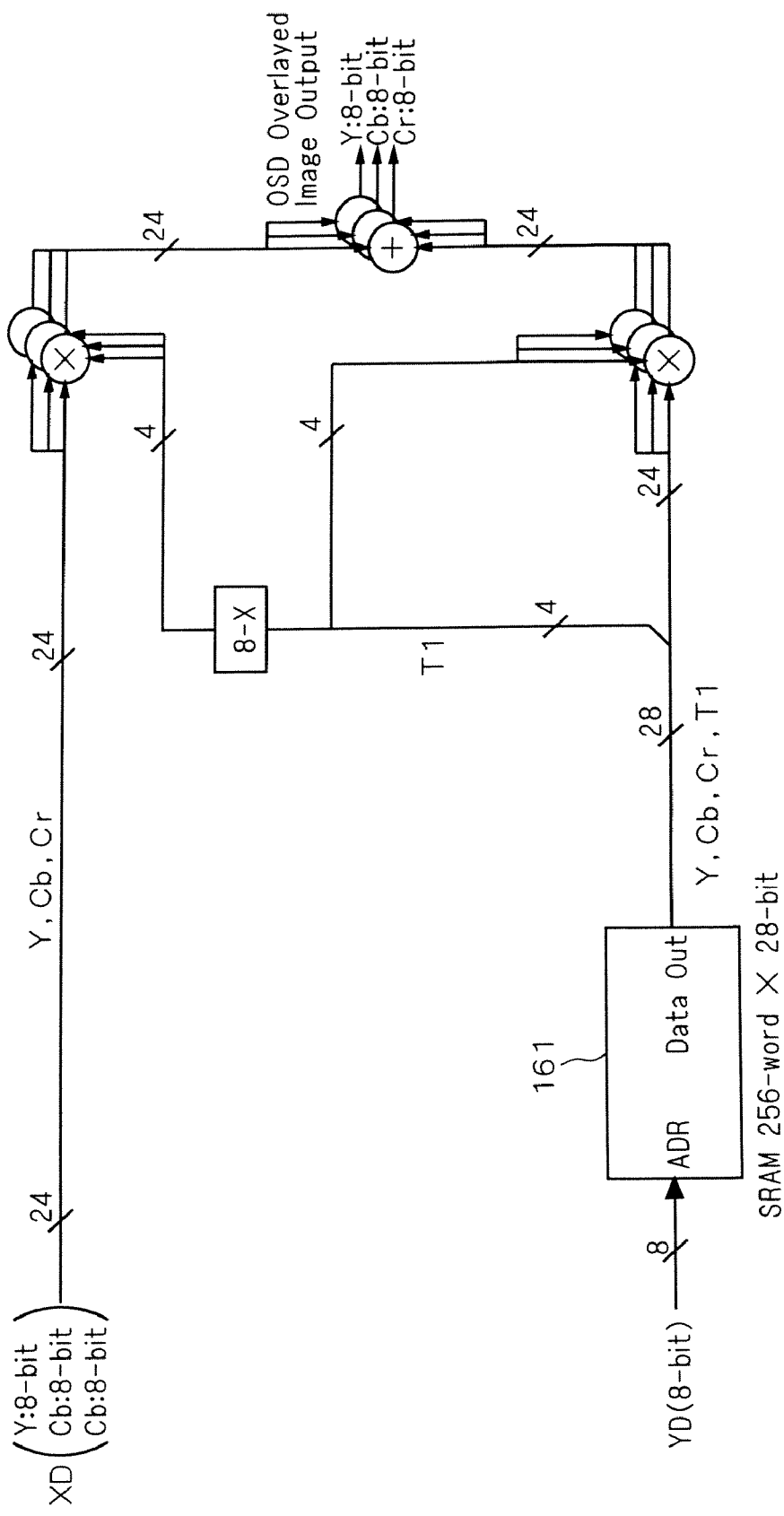
FIG. 9 shows a third conventional example of a color signal synthesizing circuit.

In this case, the circuit operates in the similar manner to the case where the 4-bit OSD data YD is inputted in the second and fourth embodiments. More specifically, the OSD data YD is exclusively consisted of the color designating signal As, and the modulation of luminance components and the modulation of transmittance are not performed by the OSD data YD, and the transmittance is determined based on the mixture ratio determining signal T1 stored in the color storage unit 41. As a result, in this mode, the circuit operates in the similar manner to the conventional synthesizing circuit shown in FIG. 7.

In the fifth embodiment, the modes of synthesized display can be switched depending on the various kinds of use. When colorful information display with 256 colors is desired or when gradation display with minutely set transmittance is desired, 8-bits data can be used as OSD data YD. When it is desired to save memory, the 4-bits OSD data YD can be used to perform the similar operations to the conventional circuit.

The first to fifth embodiments have been described as color signal synthesizing circuits for synthesizing the image data XD and the OSD data YD; however, they can be used as a color signal generating circuit for generating colors based on the entered OSD data YD except for the process of mixing with the image data XD in the color synthesizing circuit.

Modifications

In each of the above-described embodiments, the luminance components are modulated with 16 color registers so as to produce 256 colors for overlaid display. However, if the bit number of the OSD data YD can be further grown, it is possible to further increase the modulation patterns of the luminance components by increasing the bit number of the color changing signal Ex.

In the similar manner, if the bit number of the OSD data YD can be grown, it is possible to further increase the modulation patterns of the transmittance by increasing the bit number of the mixture ratio designating signal T2.

In each of the above-described embodiments, out of the Cb, Cr and Y signals, the Y signal which is the luminance components is modulated; however, instead of this, the Cb and Cr signals which are the color separation components can be modulated.

In each of the above-described embodiments, the Y, Cb and Cr space is taken as an example of the color spaces; however, the color signal synthesizing circuit of the present invention can be applied to other color spaces (RGB system, XYZ system).

While the invention has been shown and described in detail, the foregoing description is in all aspects illustrative and not restrictive. It is therefore understood that numerous modifications and variations can be devised without departing from the scope of the invention.

What is claimed is:

1. A color signal generating circuit for generating a display signal, comprising:
    a) a color storage unit including a maximum of $2^P$ registers, a storage capacity of each register in said color storage unit being r bits, and a color signal being stored in said each register;
    b) a selection unit for selecting one register from said color storage unit on the basis of a p-bit color designation signal of a (p+q)-bit first display signal input from an external device; and
    c) a calculating unit being capable of generating a maximum of $(2^P*p)$ kinds of a second display signal having r-bit data on the basis of an r-bit first color signal stored in said register selected by said selection unit and a q-bit color changing signal excluding said color designation signal from said first display signal, by multiplying the color changing signal with an s-bit Y-signal that is part of the selected r-bit first color signal of the color storage unit to generate a luminance signal, where p, q, r, and s are natural numbers.

2. The color signal generating circuit according to claim 1, wherein
    said r-bit first color signal further includes an s-bit Cb signal and an s-bit Cr signal, where s is a natural number such that r>3s is satisfied,
    said r-bit second display signal includes an s-bit Y signal, an s-bit Cb signal and an s-bit Cr signal,
    said Y signal included in said second display signal is generated on the basis of said s-bit Y signal included in said first color signal and said q-bit color changing signal, and
    said Cb signal and said Cr signal included in said second display signal correspond to said Cb signal and said Cr signal included in said first color signal, respectively.

3. The color signal generating circuit according to claim 1, further comprising:
    a truncating unit for truncating the luminance signal generated by the calculating unit to an s-bit word length, after multiplying the color changing signal with the s-bit Y-signal.

4. A color signal synthesizing circuit for synthesizing a 3s-bit first video digital signal and a (p+q)-bit second video digital signal, comprising:
    a) a color storage unit including a maximum of $2^P$ registers, a storage capacity of each register in said color storage unit being r bits, and a color signal being stored in said each register;
    b) a selection unit for selecting one register from said color storage unit on the basis of a p-bit color designation signal of said second video digital signal;
    c) a first calculating unit being capable of generating a maximum of $(2^P*p)$ kinds of a third video digital signal having r-bit data on the basis of an r-bit first color signal stored in said register selected by said selection unit, and a q-bit color changing signal excluding said color designation signal from said second video digital signal, by multiplying the color changing signal with an s-bit Y-signal that is part of the selected r-bit first color signal of the color storage unit to generate a luminance signal;
    d) a second calculating unit for multiplying a mixture ratio based on an (r−3s)-bit mixture ratio determining signal included in said third video digital signal by a 3s-bit fourth video digital signal excluding said mixture ratio determining signal from said third video digital signal;
    e) a third calculating unit for multiplying said mixture ratio by said first video digital signal; and
    f) a fourth calculating unit for generating a 3s-bit synthesized color signal by adding said fourth video digital signal output from said second calculating unit to said first video digital signal output from said third calculating unit, where p, q, r and s are natural numbers such that r>3s is satisfied.

5. The color signal synthesizing circuit according to claim 4, wherein
    said r-bit first color signal further includes an s-bit Cb signal and an s-bit Cr signal and a (r−3s)-bit mixture ratio determining signal,
    said r-bit third video digital signal includes an s-bit Y signal, an s-bit Cb signal, an s-bit Cr signal and a (r−3s)-bit mixture ratio determining signal,
    said Y signal included in said third video digital signal is generated on the basis of said s-bit Y signal included in said first color signal and said q-bit color changing signal, and
    said Cb signal, said Cr signal and said mixture ratio determining signal included in said third video digital signal correspond to said Cb signal, said Cr signal and said mixture ratio determining signal included in said first color signal, respectively.

6. The color signal synthesizing circuit according to claim 4, wherein
    said first video digital signal is a video signal taken by a digital camera, and said second video digital signal is an auxiliary information signal to be overlaid on said taken video signal.

7. A display signal generating method comprising the steps of:
    a) selecting one register from a color storage unit by a selection unit on the basis of a p-bit color designation signal of a (p+q)-bit first display signal input from an external device, said color storage unit including a maximum of $2^P$ registers, a storage capacity of each register in said color storage unit being r bits, and a color signal being stored in said each register; and b) generating a maximum of $(2^P*p)$ kinds of a second display signal having r-bit data by a calculating unit on the basis of an r-bit first color signal stored in said register selected by said step a) and a q-bit color changing signal excluding said color designation signal from said first display signal, by multiplying the color changing signal with an s-bit Y-signal that is part of the selected r-bit first color signal of the color storage unit to generate a luminance signal, where p, q, r, s and are natural numbers.

8. The display signal generating method according to claim 7, further comprising the step of:

truncating the luminance signal from said multiplying to an s-bit word length after multiplying the color changing signal with the s-bit Y-signal.

* * * * *